(12) United States Patent
Newcomb et al.

(10) Patent No.: US 7,603,246 B2
(45) Date of Patent: Oct. 13, 2009

(54) DATA INTERFACE CALIBRATION

(75) Inventors: Russell R. Newcomb, Morgan Hill, CA (US); Barry A. Wagner, San Jose, CA (US)

(73) Assignee: nVidia Corporation, Santa Clara, CA (US)

( * ) Notice: Subject to any disclaimer, the term of this patent is extended or adjusted under 35 U.S.C. 154(b) by 292 days.

(21) Appl. No.: 11/394,951

(22) Filed: Mar. 31, 2006

(65) Prior Publication Data

US 2007/0239379 A1   Oct. 11, 2007

(51) Int. Cl.
*G06F 19/00*   (2006.01)
(52) U.S. Cl. .................. 702/89; 365/201; 711/154; 713/401; 714/718
(58) Field of Classification Search .......... 702/85, 702/89, 104, 117; 713/401; 714/718, 724; 365/210; 324/763; 711/154; 327/276
See application file for complete search history.

(56) References Cited

U.S. PATENT DOCUMENTS

| | | | |
|---|---|---|---|
| 6,061,282 A * | 5/2000 | Tamaki | 365/201 |
| 6,874,097 B1 * | 3/2005 | Aliahmad et al. | 713/401 |
| 7,154,322 B2 | 12/2006 | Kim | 327/256 |
| 7,266,738 B2 * | 9/2007 | Sato | 714/718 |
| 2006/0253663 A1 * | 11/2006 | Johnson et al. | 711/154 |

OTHER PUBLICATIONS

GDDR5 Proposal, ATI Technologies Inc., pp. 1-5, Oct. 26, 2005.
English translation of Korean Office Action dated Mar. 11, 2008 for related Korean Patent Pub. No. 2005-76202, 2 pages.

* cited by examiner

*Primary Examiner*—John H Le
(74) *Attorney, Agent, or Firm*—Berkeley Law & Technology Group, LLP

(57) ABSTRACT

Embodiments for positioning transitions in one or more data signals in relation to a data strobe signal are disclosed. For an example embodiment, a receiving device may return a test value to a transmitting device. Timing for one or more data signals may be adjusted in relation to a clock signal according, at least in part, to the test value returned from a receiving device.

25 Claims, 11 Drawing Sheets

DATA INTERFACE CALIBRATION

BACKGROUND

This disclosure is related to adjusting the timing of data transitions on a parallel interface in relation to a data strobe signal within a computing platform.

As interfaces between components in computing platforms and/or between units within integrated circuits increase in transmission speed and/or bus width, noise and signal integrity issues increase in importance. For some computing platforms, data transfer interfaces may include data that is latched at a receiving device or unit in response to rising and/or falling edges of a clock signal or a data strobe signal generated either by a transmitting device or generated within the receiving device by dividing the clock signal. In response to increased data transfer rates, calibration operations may be performed by some systems to compensate for timing differences between the data signals and one or more data strobe or clock signals. Timing differences may vary over time as a result of variations in voltage and/or temperature.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description if read with the accompanying drawings in which:

DETAILED DESCRIPTION

Figure 1:
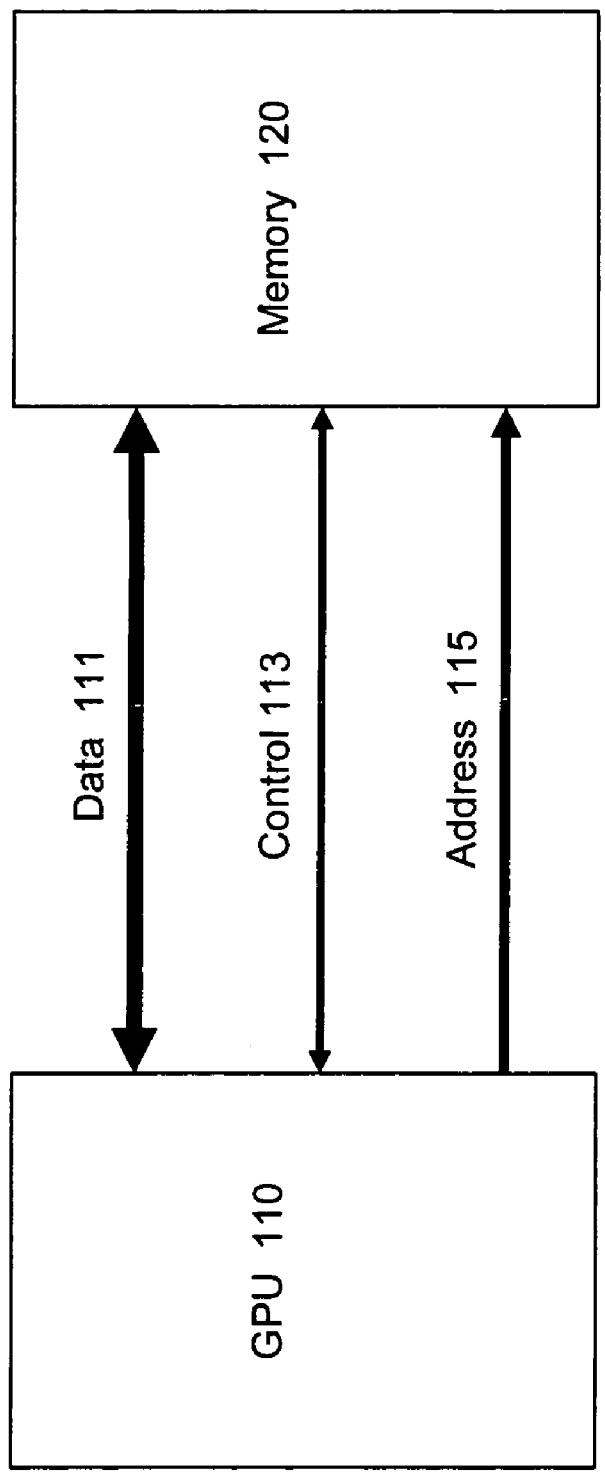
FIG. 1 is a block diagram of an example embodiment of a graphics processing unit coupled to a memory device via a data transfer interface.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail so as not to obscure claimed subject matter.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" and/or "an embodiment" in various places throughout this specification are not necessarily all referring to the same embodiment. Furthermore, the particular features, structures, and/or characteristics may be combined in one or more embodiments.

"Logic" as referred to herein relates to structure for performing one or more logical operations. For example, logic may comprise circuitry which provides one or more output signals based at least in part on one or more input signals. Such circuitry may comprise a finite state machine which receives a digital input signal and provides a digital output signal, or circuitry which provides one or more analog output signals in response to one or more analog input signals. Such circuitry may be provided, for example, in an application specific integrated circuit (ASIC) and/or a field programmable gate array (FPGA). Also, logic may comprise machine-readable instructions stored in a storage medium in combination with a processor or other processing circuitry to execute such machine-readable instructions. However, these are merely examples of structures which may provide logic and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "identifying," "initiating," "querying," "obtaining," "hosting," "maintaining," "representing," "modifying," "receiving," "transmitting," "storing," "determining" and/or the like refer to the actions and/or processes that may be performed by a computing platform, such as a computer or a similar electronic computing device, that manipulates and/or transforms data represented as physical, electronic and/or magnetic quantities and/or other physical quantities within the computing platform's processors, memories, registers, and/or other information storage, transmission, reception and/or display devices. Accordingly, a computing platform refers to a system or a device that includes the ability to process and/or store data in the form of signals. Thus, a computing platform, in this context, may comprise hardware, software, firmware and/or any combination thereof. Further, unless specifically stated otherwise, a process as described herein, with reference to flow diagrams or otherwise, may also be executed and/or controlled, in whole or in part, by a computing platform.

As used herein, the term "clock signal" is meant to include any periodic signal used to control timings in any device, component, unit, or circuit in an electronic device such as a computing platform. Further, the term "clock signal" is meant to include data strobe signals used to latch data. For some embodiments, these data strobe signals may be generated within a device based at least in part on a received clock signal. For example, a data strobe may be generated by using a phase locked loop (PLL) circuit to divide a clock signal.

Calibration operations may be performed in an effort to adjust the timing of one or more data lines in relation to one or more data strobes or clock signals. Other calibration operations may be performed in an effort to move rising and/or falling edges of a clock or data strobe signal to a position that best ensures reliable and fast data transfer. Calibration operations for the embodiments described herein may be performed at system power up and/or may be performed during system operation. Calibration operations may comprise entering a special calibration mode and performing special calibration operations. Calibration operations for one example embodiment may occur between a graphics processing unit (GPU) and a random access memory (RAM) device. A GPU or other data transmitting device may comprise circuitry to adjust the timing of one or more data signals in relation to one or more clock signals. For another embodiment, a memory device may include circuitry to adjust the timing of a data strobe or clock signal used to latch incoming data, although the scope of the claimed subject matter is not limited in this respect. Other memory devices may not include circuitry to adjust the timing of a data strobe or clock signal. For one example embodiment, a memory device may also include a register or other storage circuitry to store calibration test data. While the embodiments described herein discuss memory devices and GPUs, other embodiments are possible where the calibration circuitry and techniques described herein are included in any of a wide range of devices. Calibration operations as described herein may also be referred to as calibrated Clock Data Recovery (CDR).

A calibration operation may begin with a command being issued by a GPU to a memory device, although for some embodiments no command may be issued. The GPU may perform one or more write transactions followed by a read transaction to the memory device. For the write transaction the GPU may shift the write data by one-half of a bit time to allow data sampler circuitry within the memory device to act as phase sampling circuitry. For another embodiment, the GPU may shift a data strobe or clock signal by one-half of a bit time which would also permit the data sampler circuitry of the DRAM to act as phase sampling circuitry. Although the embodiments described herein mention shifting data lines and/or data strobes and/or clock signals by one-half of a bit time, other embodiments may shift by amounts other than one-half of a bit time. The amount of change in data line timing may be configurable.

As discussed above, a calibration operation may include the GPU writing and reading data to and from the memory device. The GPU may perform the write operation with the write data shifted by one-half of a bit time. The shifting of the data may cause the memory to sample the write data at approximately an edge of a data strobe signal rather than in an approximate middle of a bit time. The sampled data may be read back by the GPU and examined to determine if an adjustment should be made to timing of the data signals in relation to a clock signal. Wide parallel busses may comprise a number of subdivisions perhaps referred to as byte lanes. Calibration operations may occur on a byte-lane by byte-lane basis, or may be made for the entire bus, or may be made for smaller subdivisions of the bus or smaller divisions of a byte-lane. For example, for some embodiments each individual data line may be independently adjusted.

Any of several options may be used when reading back the previously written calibration data. The data may be stored in close proximity to input pads at the memory device so that the GPU can immediately read it back. For one embodiment, storage circuitry may be provided in the memory to store two burst lengths of data. Other embodiments may store other amounts of data. For another embodiment, the write data may be stored in the memory core and read by the GPU in the usual fashion. For another embodiment, write data may be delivered to the memory via a subset of a byte lane or other subdivision of the parallel bus and the read data can be immediately provided on the remaining subset of the byte lane. For example, the first four bits of a byte lane may be used to transmit calibration data and the other four bits may be used to read the results of the calibration write operation. Other possibilities may include writing to the memory device over odd-numbered bits and reading back over even-numbered bits. Still other embodiments are possible.

The embodiments described herein for performing calibration operations for data interfaces may provide a range of advantages. For example, for some embodiments the same data pattern may be used for each calibration operation. Further, for the embodiments described herein feedback may be provided for every comparison result allowing frequent timing adjustments. Adjustment decisions may be based on a single calibration test data write/read cycle or may be based on a number of calibration test data write/read cycles. For some embodiments, frequent timing adjustments may be made in an effort to improve data dependent jitter on the data transfer interface. Further, for some embodiments, the frequency of calibration operations may be adjusted to vary the amount of bandwidth utilized for calibration operations depending on system requirements. Also, for one or more embodiments, no additional circuitry may be included in the memory device or other receiving device to enable calibration operations.

FIG. 1 is a block diagram of an example embodiment of a graphics processing unit (GPU) 110 coupled to a memory device 120 via a data transfer interface. For this example embodiment, the data transfer interface may comprise one or more data lines 111, one or more control lines 113, and one or more address lines 115, although the scope of the claimed subject matter is not limited in this respect. GPU 110 and memory device 120 are merely examples of component and/or device and/or unit types that may be coupled via data transfer interfaces, and the scope of the claimed subject matter is not limited in this respect.

Figure 2:
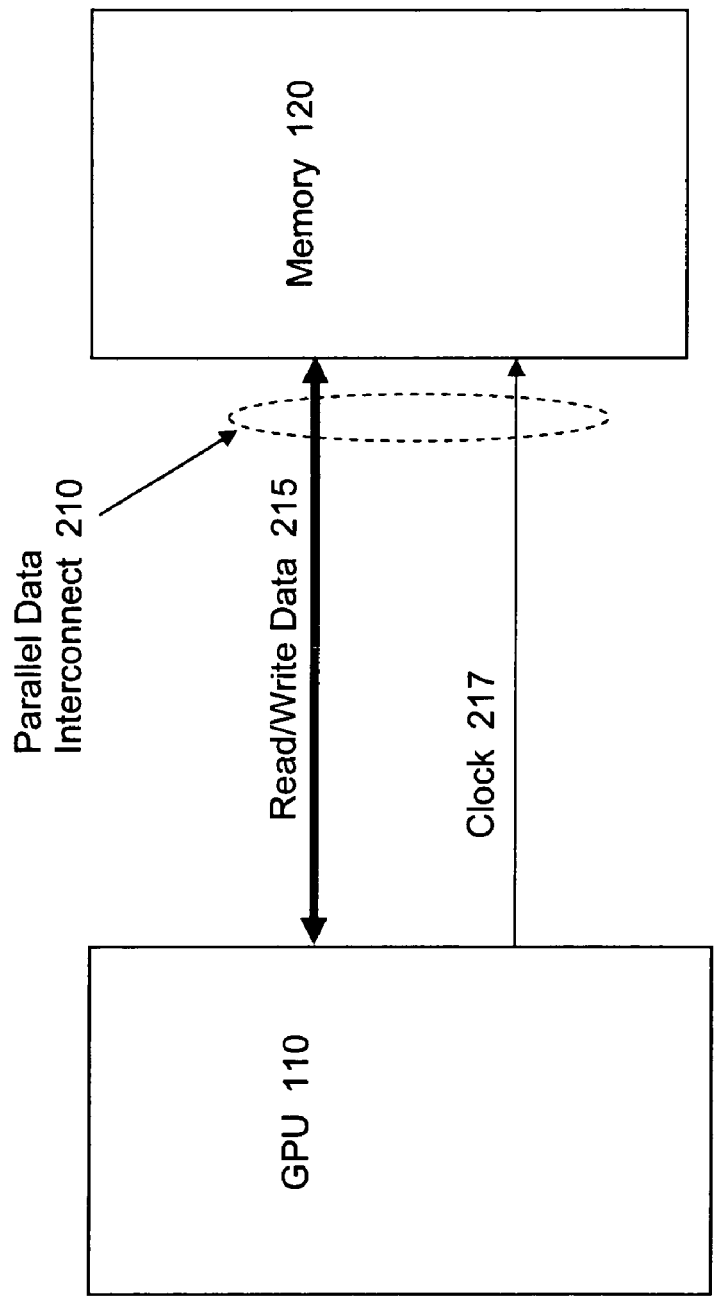
FIG. 2 is a block diagram of an example embodiment of a graphics processing unit adapted to receive read data from a memory device and to transmit write data and a clock signal to the memory device.

FIG. 2 depicts memory device 120 and GPU 110 coupled via a parallel data interconnect 210. For this example embodiment, read/write data 215 may be transferred over a plurality of parallel data lines. For this example embodiment, data lines 215 may be used to transfer both read and write data, although the scope of the claimed subject matter is not limited in this respect. Other embodiments are possible where read and write data do not share the same lines. For this example embodiment, memory device 120 may latch write data on the data lines 215 in response to transitions of a write data strobe generated within memory device 120. The write data strobe may be generated by dividing clock signal 217, although the scope of the claimed subject matter is not limited in this respect. For other embodiments, memory device 120 may latch data in response to rising and/or falling edges of clock signal 217. That is, clock signal 217 may function as a data strobe signal. Clock signal 217 may be delivered to memory device 120 by GPU 110 for this example embodiment. GPU 110 is merely an example of a transmitting device, component, and/or unit, and the scope of the claimed subject matter is not limited in this respect. Also, memory device 120 is merely an example of a receiving device, component, and/or unit, and the scope of the claimed subject matter is not limited in this respect.

Figure 3:
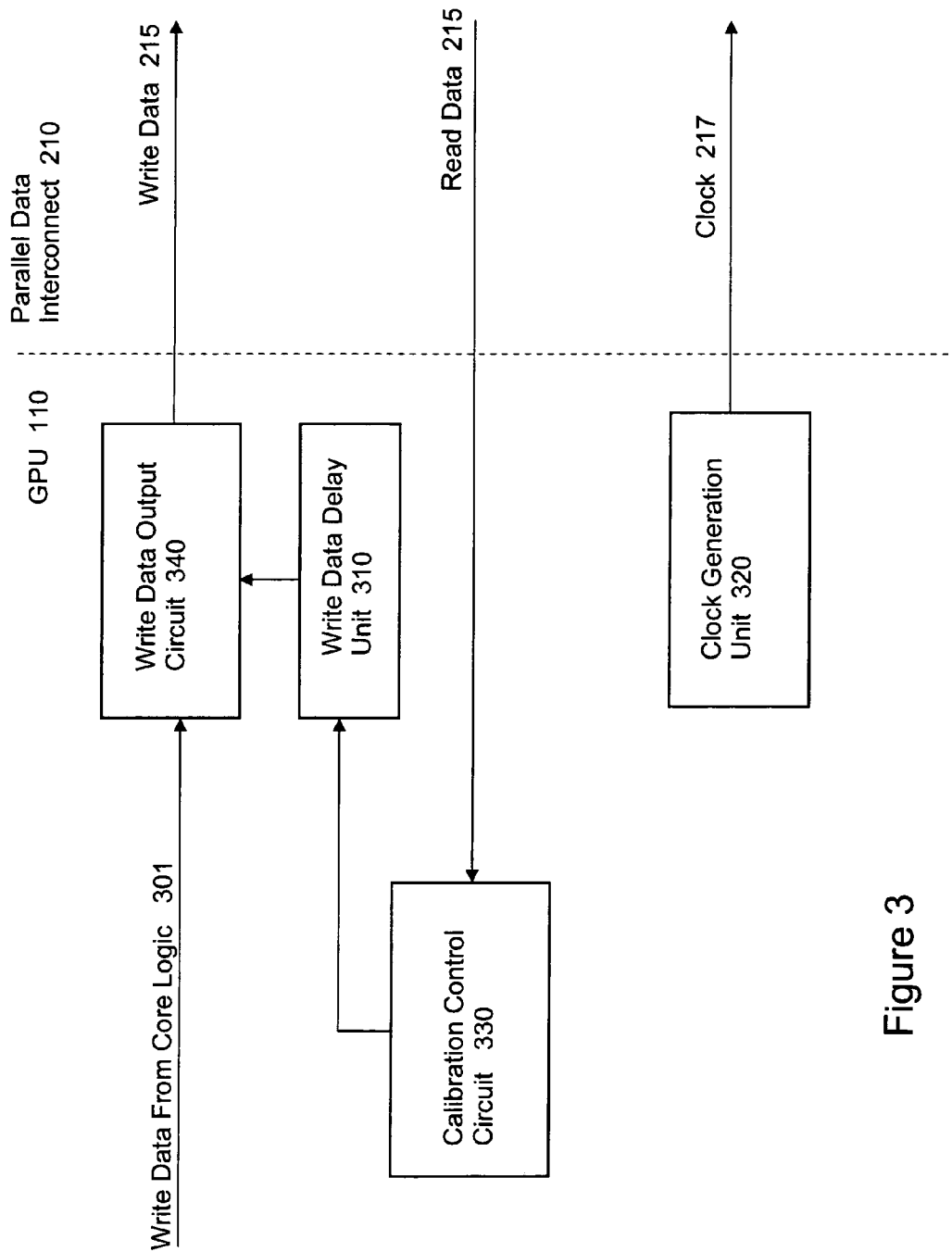
FIG. 3 is a block diagram of an example embodiment of a data transmitting device comprising a calibration control circuit and a write data delay unit.

FIG. 3 is a block diagram of an example embodiment of a data transmitting device comprising a calibration control circuit 330 and further comprises a write data delay unit 310 coupled to a write data output circuit 340. This example embodiment is merely one possible embodiment of a transmitting device, and the scope of the claimed subject matter is not limited in this respect. For this example, the data transmitting device comprises GPU 110, although again the scope of the claimed subject matter is not limited in this respect. Write data delay unit 310 may comprise any circuitry capable of adjusting the timing of one or more data lines. For one embodiment, delay unit 310 may comprise a delay locked loop (DLL) circuit, although the scope of the claimed subject matter is not limited in this respect. For this example, write data output circuit 340 may receive write data 301 from a core logic unit. Depending on information communicated by the calibration control circuit 330, write data delay unit 310 may adjust the timing of one or more write data lines 215. GPU 110 for this example may also comprise a clock generation unit 320, although the scope of the claimed subject matter is not limited in this respect. For some embodiments, the clock signal may be generated external to the transmitting device and/or the receiving device.

Calibration control circuit 330 may also receive read data 215 during calibration operations. Depending on data received over one or more data lines 215 during a calibration operation, calibration control circuit 330 may determined whether to adjust the timing of write data 215 by way of write data delay unit 310. Various aspects of this example embodiment may be better understood in light of the discussion below in connection with the remaining figures.

Figure 4:
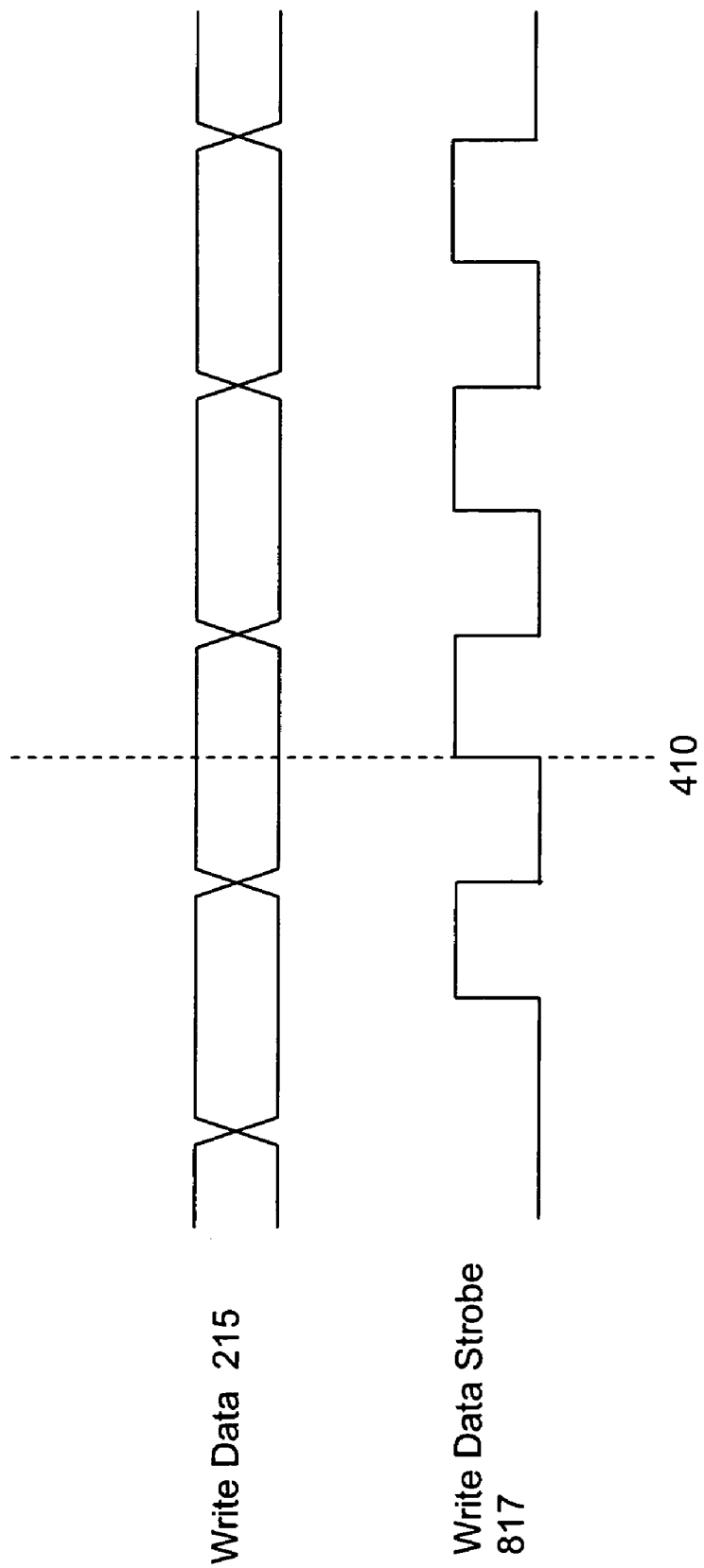
FIG. 4 is an example timing diagram depicting write data and its approximate relationship to a write data strobe signal.

FIG. 4 is a timing diagram depicting an example timing relationship between one or more write data lines 215 and a write data strobe signal 817. For this example and the examples that follow, data strobe signal 817 may be generated within a receiving device, in this case a memory device. Data strobe 817 may be generated by dividing a clock signal received from a transmitting device (such as clock signal 217 for this example), although the scope of the claimed subject matter is not limited in this respect. This diagram depicts a non-calibration operation. For this example, GPU 110 generates transitions for the write data signals where rising edges of the write data strobe 817 occur approximately in the middle of a bit time, for example at time 410 as depicted in FIG. 4. As can be seen in FIG. 4, a new write data value may be driven onto data lines 215 upon each falling edge of data strobe signal 817, although the transmitting device does not for this example drive data in response to the falling edge of the strobe signal, as for this example the transmitting device is not aware of the data strobe signal generated with the receiving device. However, this is merely an example relationship between one or more data lines and a strobe signal, and the scope of the claimed subject matter is not limited in this respect.

The term "bit-time" as used herein may refer to the approximate duration of one data pulse (one bit) on a data signal or data transfer interconnect. For example, a data transfer interconnect with a bit rate of 100 Mbps per data line may have a bit-time of 10 ns. That is, for this example, one bit of data may be transferred across one line of the data transfer interconnect every 10 ns. This is merely an example of a bit-time, and the scope of the claimed subject matter is not limited in this respect. Also, as used herein, the term "transition" in connection with a signal is meant to denote a change in state from a first logical voltage level to a second logical voltage level.

As previously mentioned, as data transfer rates increase on data transfer interfaces, issues such as noise and timing skew between various signals play increasingly important roles in limiting potential performance of the data transfer interfaces. For an interface such as the example interface described above in connection with FIGS. 1-4, one issue that may limit potential performance is timing skew between a clock signal and associated data lines. This time skew may be due to any of a number of factors, including different electrical trace lengths for the various signals on printed circuit boards, variations of electrical characteristics of electrical connections coupling the transmitting device and the receiving device, variations in drive strength at the transmitting device for the various signals, etc. Timing skew between one or more data lines and a clock signal may affect when the receiving device samples the data. Ideally, a receiving device would sample the data lines at a point in time that provides optimal set-up and hold times. Timing skew between the data lines and the clock signal may result in the receiving device not sampling the data lines at an approximately optimal point in time.

For the example embodiments described herein, a receiving device may latch data in response to a rising edge of a strobe signal, although the scope of the claimed subject matter is not limited in this respect. For other embodiments, data may be latched in response to both rising and falling edges of a strobe signal. For one embodiment, the interface between GPU 110 and memory device 120 may comprise a Double Data Rate (DDR) memory interface. For such an embodiment, for every period of a strobe signal, two data transitions occur. For DDR and other interfaces where data is latched in response to both rising and falling edges of a strobe signal, additional timing issues may occur due to variations in the duty cycle of the strobe signal.

Figure 5:
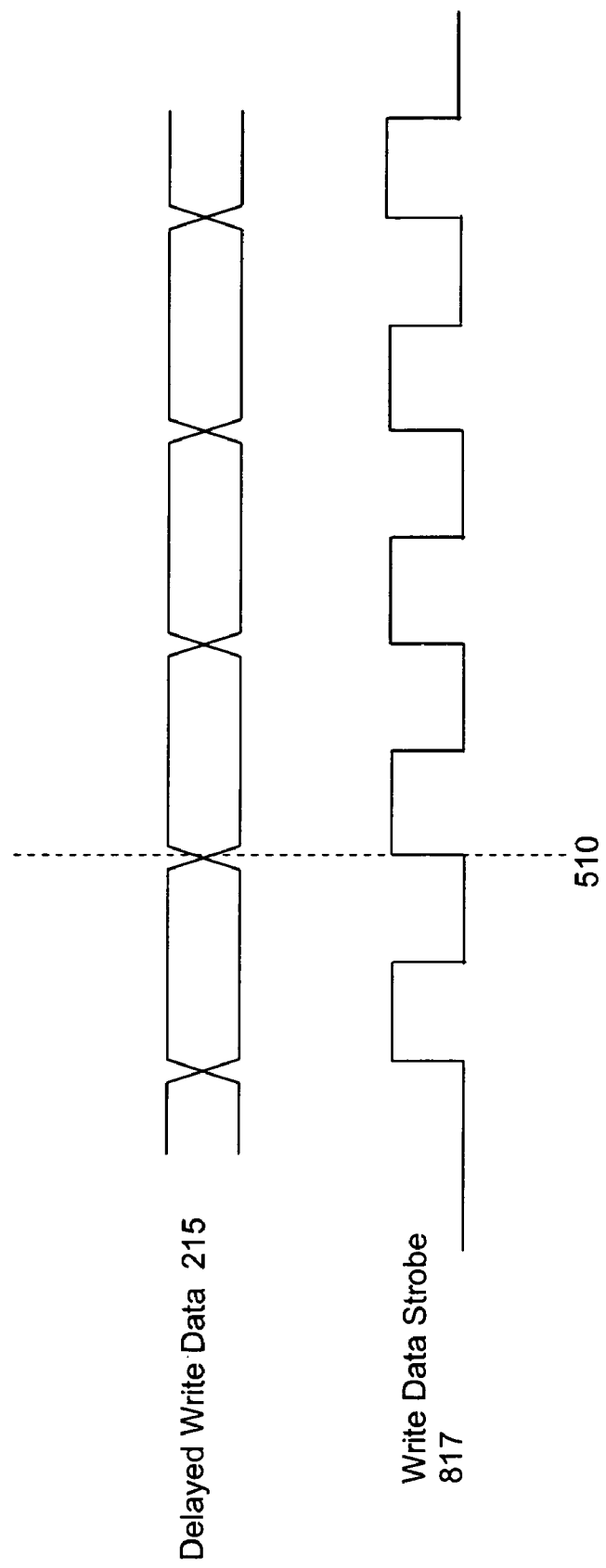
FIG. 5 is an example timing diagram depicting delayed write data and its approximate relationship to a write data strobe signal.

FIG. 5 is a timing diagram depicting an example timing relationship between one or more write data lines 215 and write data strobe signal 817. As previously mentioned, write data strobe 817 may be generated within the receiving device at least on part by dividing a clock signal, although the scope of the claimed subject matter is not limited in this respect. This diagram depicts an example calibration operation. For this example, GPU 110 may delay the write data signals 215 by approximately one-half of a bit-time. As a result, memory device 120 may receive transitions for the write data signals at approximately the same time that rising edges of the data strobe occur, for example at time 510 as depicted in FIG. 5. However, this is merely an example relationship between one or more data lines and a strobe signal, and the scope of the claimed subject matter is not limited in this respect.

Figure 6:
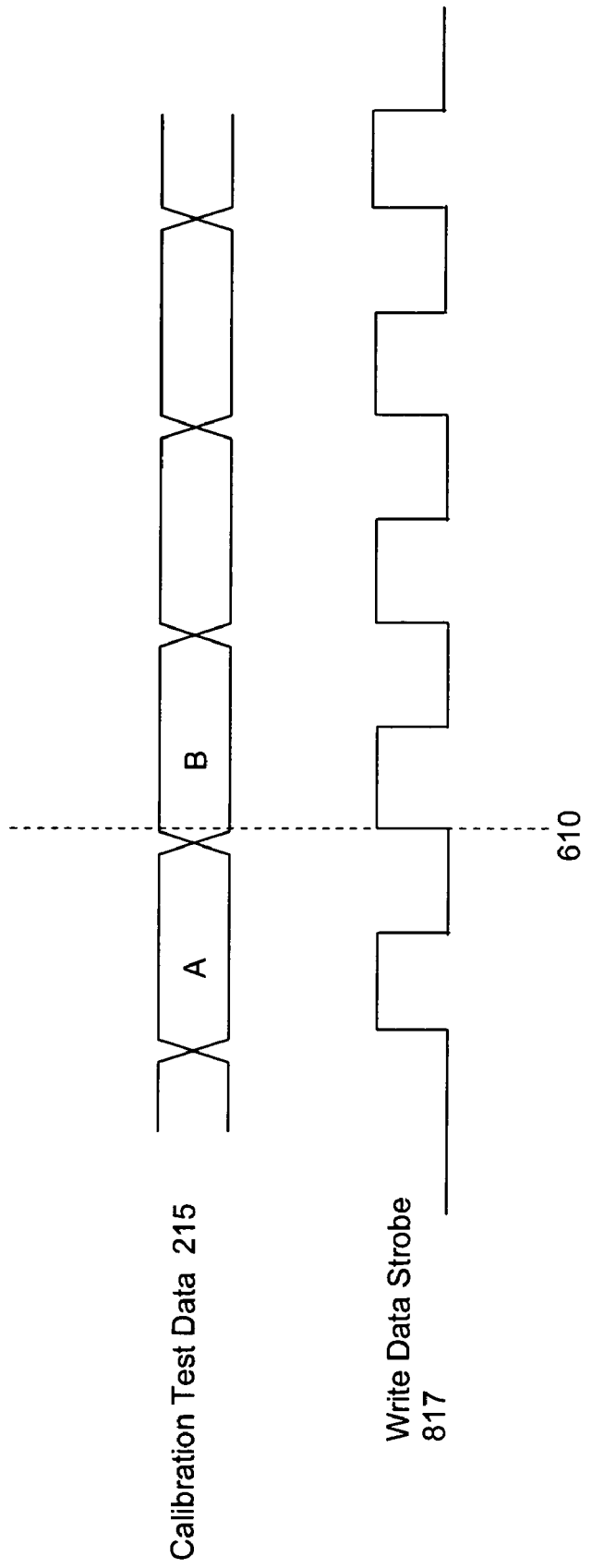
FIG. 6 is an example timing diagram depicting calibration test data and a write data strobe.

FIG. 6 is a timing diagram depicting an example timing relationship between one or more write data lines 215 and write data strobe signal 817 as received at or generated by a receiving device such as memory device 120. This diagram depicts an example calibration operation. For this example, GPU 110 may delay the write data signals 215 by approximately one-half of a bit-time. For this example, a receiving device such as memory device 120 may latch data in response to the rising edges of the data strobe. Also for this example, GPU 110 may output two calibration test values during two consecutive bit-times. For this example the test values are labeled "A" and "B." For this example timing diagram, at time 610, write data strobe 817 transitions from a logically low level to a logically high level (a rising edge). As a result, the calibration test data on lines 215 are sampled by memory device 120. In this example, the test value present on lines 215 at time 610 is test value B. Test value B may be returned to GPU 110, and adjustments may be made to the timing of data lines 215 in response to the test value sampled at the rising edge of data strobe 817. For this example, because the second of the two test values was sampled by memory device 120, GPU 110 may advance the timing of data lines 215 so that during normal operation (where the data lines are not delayed by a half-bit time) the rising edges of data strobe 817 may occur closer to the middle of the bit-times, thus helping to ensure optimal set-up and hold times for data lines 215.

Figure 7:
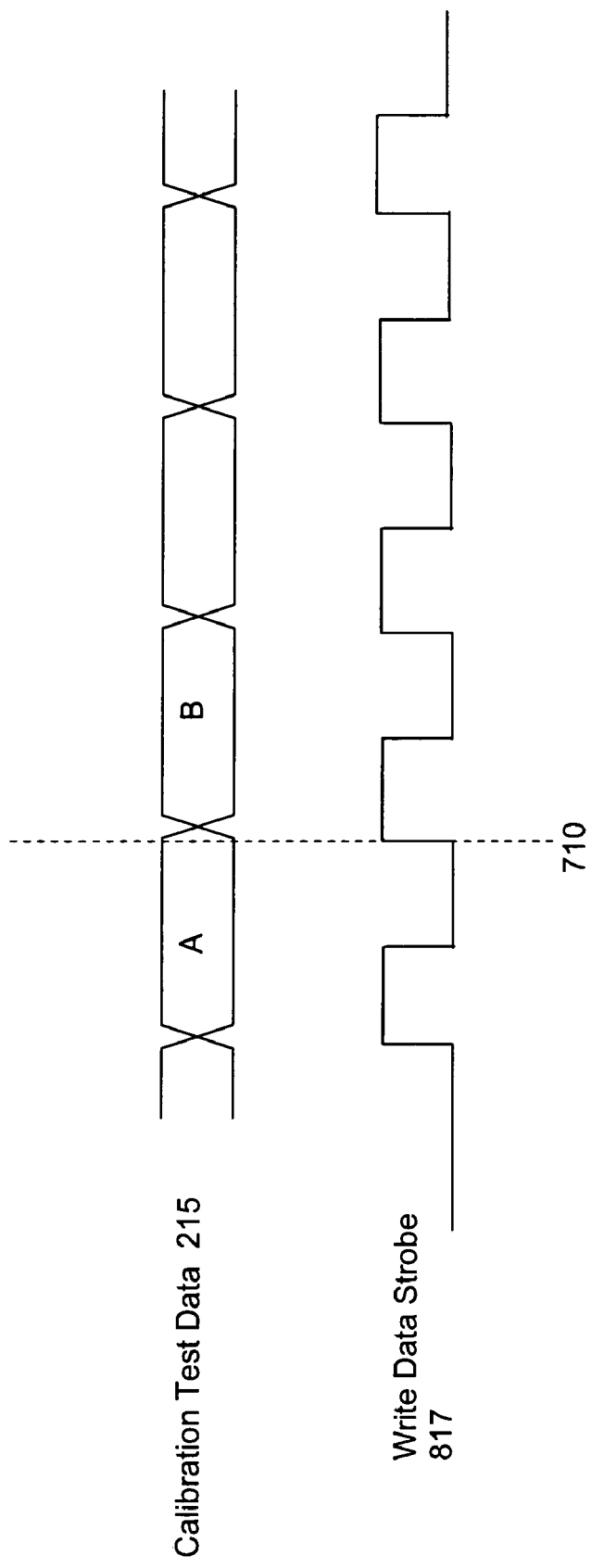
FIG. 7 is an example timing diagram depicting calibration test data and a write data strobe.

FIG. 7 is a timing diagram depicting an example timing relationship between one or more write data lines 215 and write data strobe signal 817 as received at a or generated by a receiving device such as memory device 120. This diagram depicts an example calibration operation. For this example, GPU 110 may delay the write data signals 215 by approximately one-half of a bit-time. For this example, a receiving device such as memory device 120 may latch data in response to the rising edges of the data strobe. Also for this example, GPU 110 may output two calibration test values during two consecutive bit-times. For this example the test values are labeled "A" and "B." For this example timing diagram, at time 710, write data strobe 817 transitions from a logically low level to a logically high level (a rising edge). As a result, the calibration test data on lines 215 are sampled by memory device 120. In this example, the test value present on lines 215 at time 710 is test value A. Test value A may be returned to GPU 110, and adjustments may be made to the timing of data lines 215 in response to the test value sampled at the rising edge of data strobe 817. For this example, because the first of the two test values was sampled by memory device 120, GPU 110 may retard the timing of data lines 215 so that during normal operation (where the data lines are not delayed by a half-bit time) the rising edges of data strobe 817 may occur closer to the middle of the bit-times, thus helping to ensure optimal set-up and hold times for data lines 215.

Figure 8:
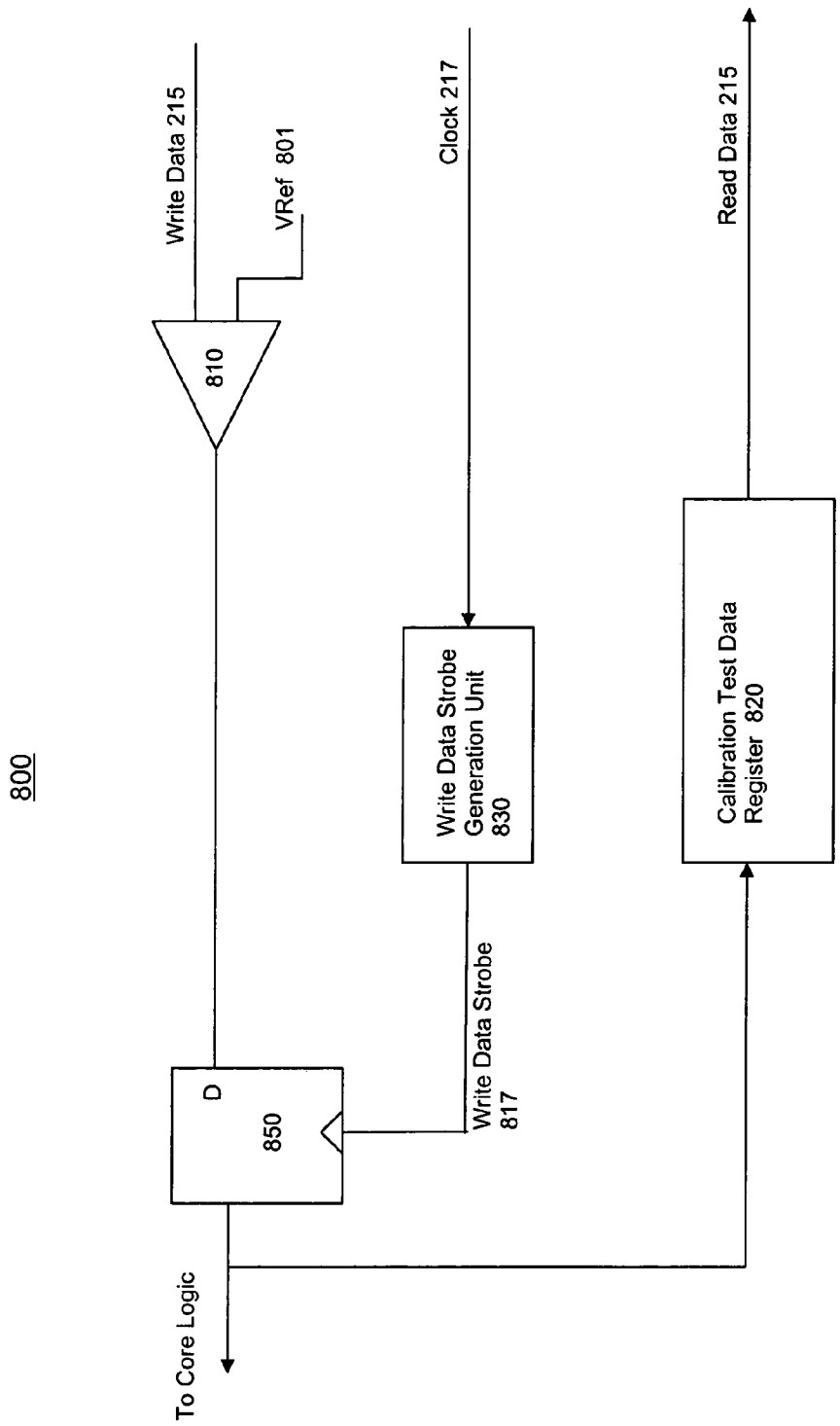
FIG. 8 is a schematic diagram of an example embodiment of a receiving device comprising a calibration test data register.

FIG. 8 is a schematic diagram of an example embodiment of circuit 800 including a calibration test data register 820. The example embodiment of circuit 800 may be incorporated into a receiving device and/or unit coupled to a data transfer interface, such as for one embodiment memory device 120.

Circuit 800 further may further comprise a comparator 810 capable of receiving a write data signal 215 and a reference voltage signal 801. If the voltage level on write data 215 exceeds VRef 801, comparator 810 drives its output to a logically high voltage level. If the voltage level on write data 215 is less than VRef 801, comparator 810 drives its output to a logically low voltage level. The output of comparator 810 is coupled to an input of a flip-flop 850. Although this example embodiment contemplates single-ended signaling, the scope of the claimed subject matter is not limited in this respect. For example, other embodiments are possible using differential signaling. For some embodiments, differential signaling may be used for the data lines and/or the clock signal.

Also included in example circuit 800 is a write data strobe generation unit 830. A clock signal 217 may be received at circuit 800. Write data strobe generation circuit 830 for one example embodiment may comprise a PLL circuit to divide clock signal 217 to produce write data strobe 817. For one embodiment, clock signal 217 may have a frequency of 500 MHz and write data strobe 817 may have a frequency of 4 GHZ.

Flip-flop 850 for this example embodiment latches data at its input in response to rising edges of write data strobe 817. The output of flip-flop 850 may be coupled to other circuitry within a receiving device, for example a core logic unit, although the scope of the claimed subject matter is not limited in this respect. For one embodiment, the output of flip-flop 850 may be coupled to the calibration write data register 820, although, again, the scope of the claimed subject matter is not limited in this respect.

Calibration write data register 820 may store calibration write data, making the data available to GPU 110. In another embodiment, the output of flip-flop 850 may be transmitted to GPU 110 immediately without first storing it in a register or other storage circuit.

Although FIG. 8 depicts circuit 800 receiving a single data line 215, other embodiments are possible where a data strobe signal and/or clock signal is associated with a plurality of data lines. For one embodiment, one data strobe signal may be associated with eight data lines. For another example embodiment, one data strobe signal may be associated with nine data lines. Of course, these are merely examples of the numbers of data lines that may be associated with a data strobe signal, and the scope of the claimed subject matter is not limited in these respects.

Although circuit 800 is described with a particular arrangement of circuitry, components, and/or units, other arrangements and/or configurations are possible. The scope of the claimed subject matter is not limited to the specific embodiment described in connection with example circuit 800.

Figure 9:
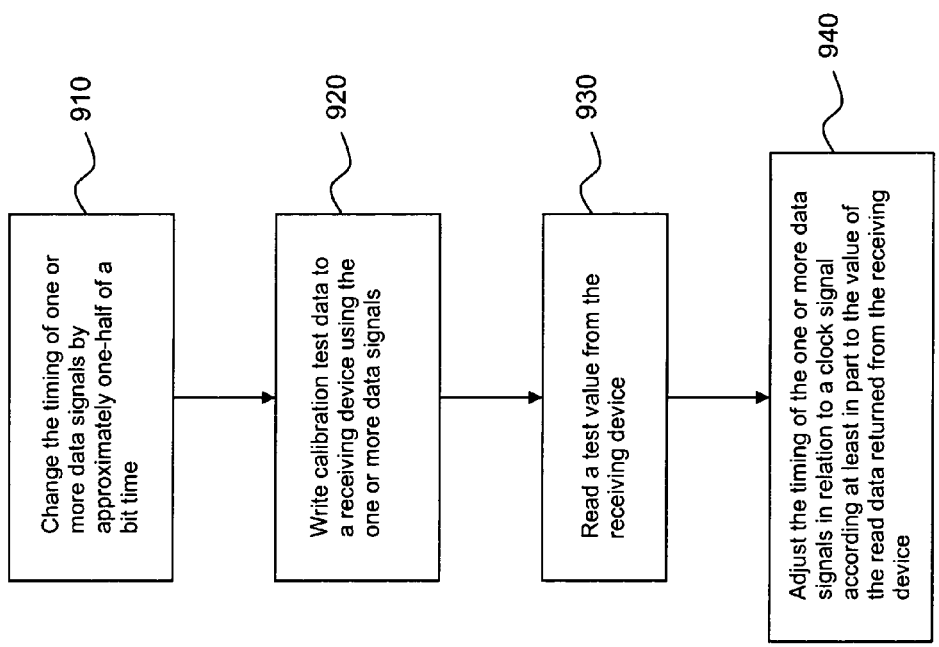
FIG. 9 is a flow diagram of an example embodiment of a method for data interface calibration.

FIG. 9 is a flow diagram of an example embodiment of a method for data interface calibration. At block 910, the timing of one or more data signals is changed by approximately one-half of a bit-time. For this example, changing the timing may comprise delaying the one or more data signals. For other embodiments, the one or more data signals may be advanced in order to change the timing. At block 920, calibration test data is written to a receiving device using the one or more data signals. At block 930, a test value is read from the receiving device. At block 940, the timing of the one or more data signals are adjusted in relation to a clock signal according at least in part to the value of the read data returned from the receiving device. An embodiment in accordance with claimed subject matter may include all, more than all or less than all of blocks 910-940. Furthermore, the order of blocks 910-940 is merely one example order, and the scope of the claimed subject matter is not limited in this respect.

Figure 10:
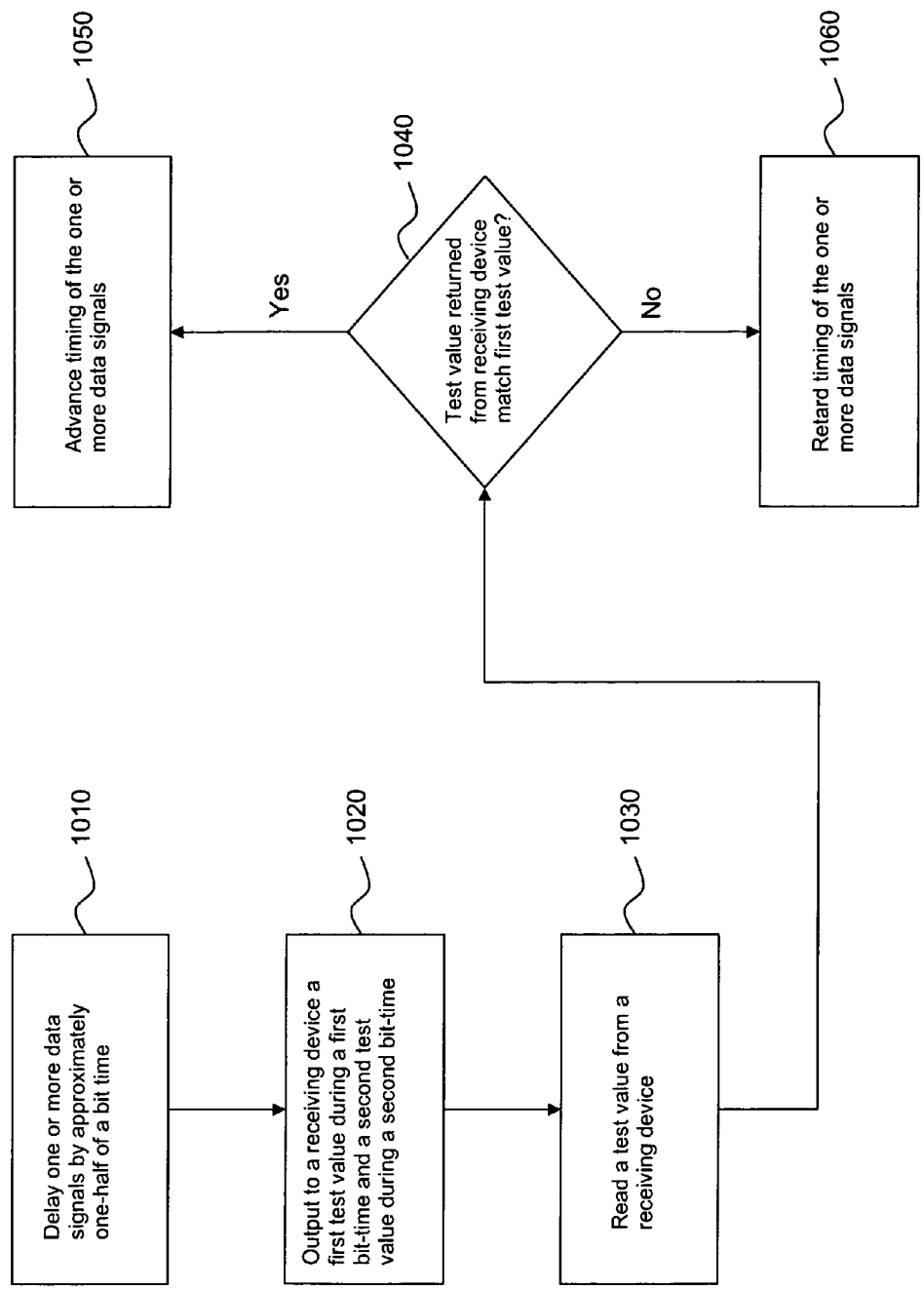
FIG. 10 is a flow diagram of an example embodiment of a method for data interface calibration.

FIG. 10 is a flow diagram of an example embodiment of a method for data interface calibration. At block 1010, one or more data signals are delayed by approximately one-half of a bit-time. At block 1020, a first test value is output to a receiving device during a first bit-time and a second test value during a second bit-time. At block 1030, a test value is read from a receiving device. At block 1040, a determination is made as to whether the test value returned from the receiving device matches the first test value. If the test value returned from the receiving device matches the first test value, the timing of the one or more data signals are advanced at block 1050. If the test value returned from the receiving device does not match the first test value, the timing of the one or more data signals are retarded at block 1060. An embodiment in accordance with claimed subject matter may include all, more than all or less than all of blocks 1010-1060. Furthermore, the order of blocks 1010-1060 is merely one example order, and the scope of the claimed subject matter is not limited in this respect.

Figure 11:
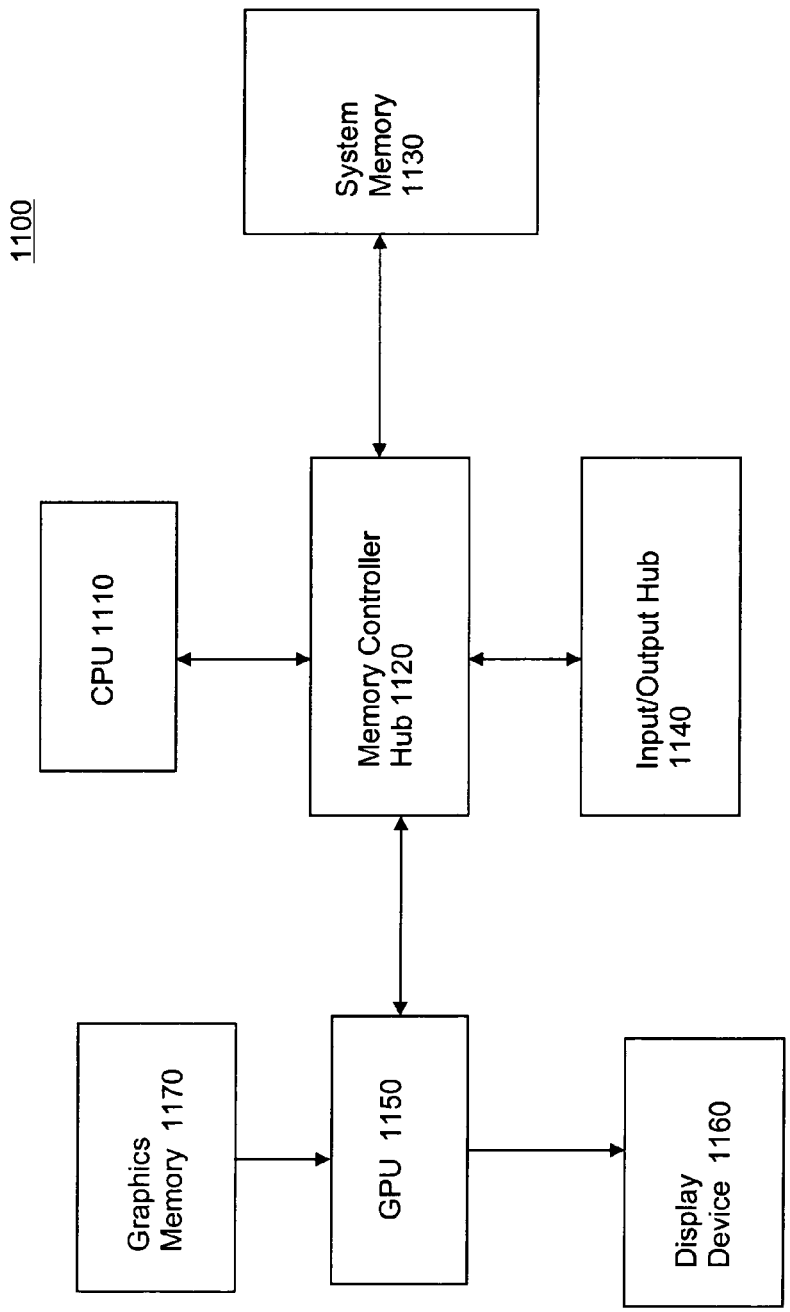
FIG. 11 is a block diagram of an example computing platform comprising a graphics processing unit coupled to a graphics memory.

FIG. 11 is a block diagram of an example embodiment of a computing platform 1100. Computing platform 1100 includes a CPU 1110 and a memory controller hub 1120 coupled to CPU 1110. Memory controller hub 1120 is further coupled to a system memory 1130, to a GPU 1150, and to an input/output hub 1140. GPU 1150 is further coupled to a display device 1160, which may comprise a CRT display, a flat panel LCD display, or other type of display device. Also coupled to GPU 1150 is a graphics memory 1170. For this example embodiment, graphics memory 1170 may be coupled to GPU 1150 via a parallel data interface. GPU 1150 may comprise circuitry similar to that discussed above in connection with FIG. 3.

Although the example platform 1100 is described with a parallel data interface between graphics memory 1170 and GPU 1150, other embodiments may include parallel data interfaces between other components within the platform. Also, the calibration embodiments described above may be included in any of a wide range of computing platform components and/or devices. That is, any of the components of computing platform 1100 may comprise transmitting devices and/or receiving devices configured in accordance with the example transmitting and receiving device embodiments described herein. Further, although the data transfer interfaces described herein are used to couple various components in a computing platform, other embodiments may include data transfer interfaces used for intra-chip data transfers, and still other embodiments are possible that may include data transfers between different integrated circuit dice that may share a package.

Although example system 1100 is shown with a particular configuration of components, other embodiments are possible using any of a wide range of configurations. Further, the example embodiments described herein may be utilized in any of a wide range of electronic devices, including, but not limited to, computing platforms, gaming consoles and devices, cellular phones, personal digital assistants, music players, communications network components, etc.

In the preceding description, various aspects of claimed subject matter have been described. For purposes of explanation, systems and configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method, comprising:
   changing a timing of one or more data signals in relation to one clock signal by a configurable timing amount to direct a receiving device to latch calibration test data approximately at a transition between a first bit time period and a second bit time period;
   writing the calibration test data to the receiving device using the one or more data signals;
   reading a test value from the receiving device; and
   adjusting, by a write delay unit, the timing of the one or more data signals in relation to the one clock signal according at least in part to the test value returned from the receiving device.

2. The method of claim 1, wherein said changing the timing of the one or more data signals in relation to the clock signal by a configurable timing amount comprises delaying the one of more data signals by approximately one-half of a bit time.

3. The method of claim 1, wherein said changing the timing of the one or more data signals in relation to the clock signal by a configurable timing amount comprises advancing the one of more data signals by approximately one-half of a bit time.

4. The method of claim 1, wherein said writing calibration test data to the receiving device comprises writing a first test value during the first bit-time period and writing a second test value during the second bit-time period.

5. The method of claim 4, wherein said adjusting the timing of the one or more data signals in relation to the clock signal comprises advancing the one or more data signals if the test value returned from the receiving device matches the first test value.

6. The method of claim 4, wherein said adjusting the timing of the one or more data signals in relation to the clock signal comprises retarding the one or more data signals if the test value returned from the receiving device matches the second test value.

7. The method of claim 1, wherein said reading the test value from the receiving device comprises reading the test value from a calibration test value buffer within the receiving device.

8. The method of claim 1, wherein said reading the test value from the receiving device comprises reading the test value from a core logic unit within the receiving device.

9. An apparatus, comprising:
   a data signal delay unit to change a timing of one or more data signals in relation to one clock signal by a configurable timing amount to direct a receiving device to latch calibration test data approximately at a transition between a first bit time period and a second bit time period; and
   a calibration control unit capable of writing to write calibration test data to the receiving device using the one or more data signals, the calibration control unit further to adjust the timing of the one or more data signals in relation to the one clock signal according at least in part to a test value returned from the receiving device.

10. The apparatus of claim 9, the data signal delay unit to change the timing of the one or more data signals by a configurable timing amount by delaying the one or more data signals by approximately one-half of a bit time.

11. The apparatus of claim 9, the data signal delay unit to change the timing of the one or more data signals by a configurable timing amount by advancing the one or more data signals by approximately one-half of a bit time.

12. The apparatus of claim 9, the calibration control unit to write calibration test data to the receiving device by writing a first test value during the first bit-time period and writing a second test value during the second bit-time period.

13. The apparatus of claim 12, the calibration control unit to adjust the timing of the One or more data signals in relation to the clock signal by advancing the one or more data signals if the test value returned from the receiving device matches the first test value.

14. The apparatus of claim 12, the calibration control unit to adjust the timing of the one or more data signals in relation to the clock signal by retarding the one or more data signals if the test value returned from the receiving device matches the second test value.

15. The apparatus of claim 12, the calibration control unit to adjust the timing of the one or more data signals in relation to the clock signal by retarding the one or more data signals if the test value returned from the receiving device matches the second test value.

16. An apparatus, comprising:
   means for changing a timing of one or more data signals in relation to one clock signal by a configurable timing amount to direct a receiving device to latch calibration test data approximately at a transition between a first bit time period and a second bit time period;
   means for writing calibration test data to the receiving device using the one or more data signals;
   means for reading a test value from the receiving device; and
   means for adjusting the timing of the one or more data signals in relation to the one clock signal according at least in part to the test value returned from the receiving device.

17. The apparatus of claim 16, wherein the means for changing the timing of the one or more data signals in relation to the clock signal by a configurable timing amount comprises means for delaying the one or more data signals by approximately one-half of a bit time.

18. The apparatus of claim 16, wherein the means for changing the timing of the one or more data signals in relation to the clock signal by approximately one-half of a bit time comprises means for advancing the one or more data signals in relation to the clock signal.

19. The apparatus of claim 16, wherein the means for writing calibration test data to the receiving device comprises means for writing a first test value during the first bit-time period and means for writing a second test value during the second bit-time period.

20. The apparatus of claim 19, wherein the means for adjusting the timing of the one or more data signals in relation to the clock signal comprises means for advancing the one or more data signals if the test value returned from the receiving device matches the first test value.

21. The apparatus of claim 19, wherein the means for adjusting the timing of the one or more data signals in relation to the clock signal comprises means for retarding the one or more data signals if the test value returned from the receiving device matches the second test value.

22. A system, comprising:
a transmitting device comprising
a data signal delay unit to change a timing of one or more data signals in relation to one clock signal by a configurable timing amount, and
a calibration control unit to write calibration test data using the one or more data signals; and
a receiving device coupled to the transmitting device, the receiving device to receive the calibration test data transmitted by the transmitting device, the transmitting device to direct the receiving device to latch the calibration test data approximately at a transition between a first bit time period and a second bit time period, the receiving device to return a test value to the transmitting device, the calibration control unit further to adjust the timing of the one or more data signals in relation to the one clock signal according at least in part to the test value returned from the receiving device.

23. The system of claim 22, the data signal delay unit to change the timing of the one or more data signals by a configurable timing amount by adjusting the one or more data signals by approximately one-half of a bit time.

24. The system of claim 22, the calibration control unit to write calibration test data to the receiving device by writing a first test value during the first bit-time period and writing a second test value during the second bit-time period.

25. The system of claim 24, the calibration control unit to adjust the timing of the one or more data signals in relation to the clock signal by advancing the one or more data signals if the test value returned from the receiving device matches the first test value.

* * * * *